Dec. 29, 1953   P. F. FABARON   2,664,351
MANUFACTURE OF MANGANESE
Filed Jan. 3, 1950                    2 Sheets-Sheet 1

Inventor
Paul Ferdinand Fabaron
By
Attorneys

Patented Dec. 29, 1953

2,664,351

UNITED STATES PATENT OFFICE 2,664,351

MANUFACTURE OF MANGANESE

Paul Ferdinand Fabaron, Mercus Garrabet, France, assignor to Societe pour l'Exploitation de Procedes de Fabrication de Produits Electro-Chimiques et Electro-Metallurgiques Indus-triels, Paris, France, a French Société a responsabilite limitee Application January 3, 1950, Serial No. 136,487

Claims priority, application France January 10, 1949

2 Claims. (Cl. 75—10)

This invention relates to the manufacture of manganese and alloys thereof, by direct treatment of low-grade ores of the metal.

At the present time, low-grade ores of manganese, such as rhodochrosite (manganous carbonate), call for an extremely costly preliminary treatment; and the necessity of bringing the ore to finely powdered condition, the separation of manganous carbonate by flotation, and the subsequent agglomeration of the powder with a view to its metallurgical treatment all involve heavy expenditure.

The present invention has for its main object to provide a process for treating such low-grade ores to produce metallic manganese, of current market quality, containing a relatively low proportion of iron and carbon, and a low proportion of impurities.

A further object is to enable low-grade manganese ores, and/or the gangues or slags resulting from their metallurgical recovery to be made of value in an economical manner.

Another object of the invention is to provide a process of this nature which yields valuable by-products including carbides.

More specifically, the present invention has for its object to provide a process combining the conditions for maximum yield and minimum loss, for the treatment in the electrical furnace of naturally occurring low-grade ores of manganese, carbonate and/or oxides, either raw or calcined, or mixtures of raw and calcined ores, for the separate or simultaneous preparation of metallic manganese or alloys thereof, and alkaline-earth metal carbides containing magnesia and adapted to be converted into cyanamide or to be decomposed for production of acetylene gas and slimes or sludge, which latter can serve as magnesium-containing fertilizers, possessing catalytic properties due to the presence of traces of manganese.

Figure 2:
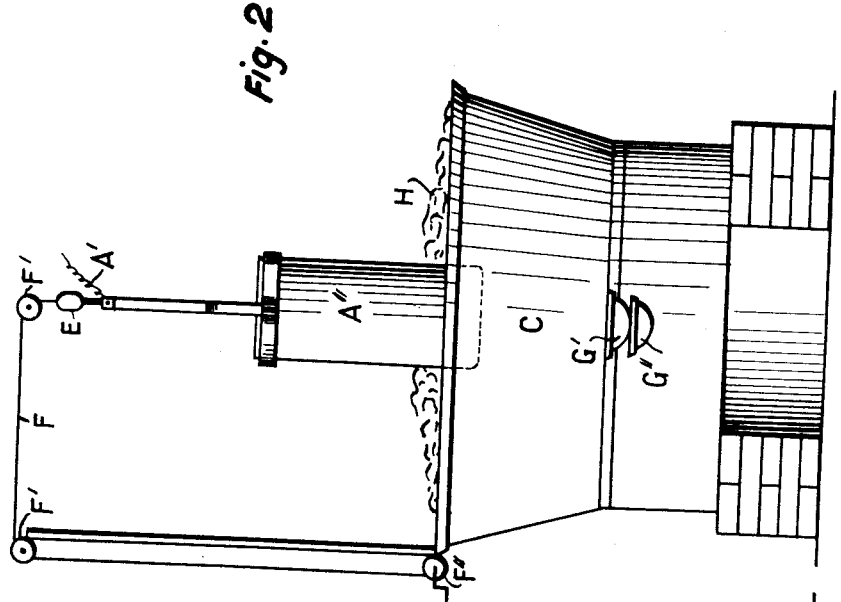
Figure 1:
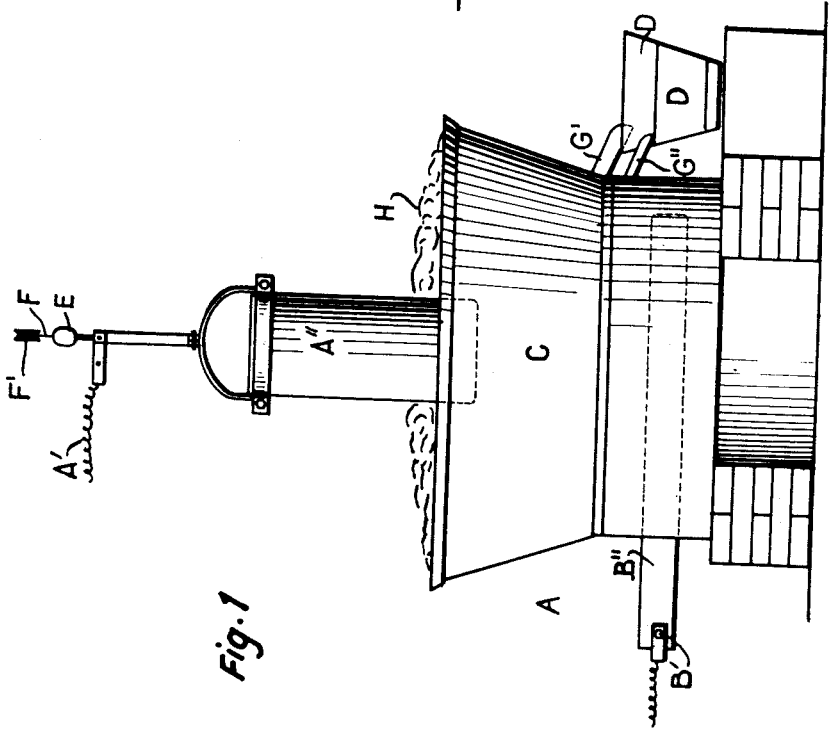
Figure 3:
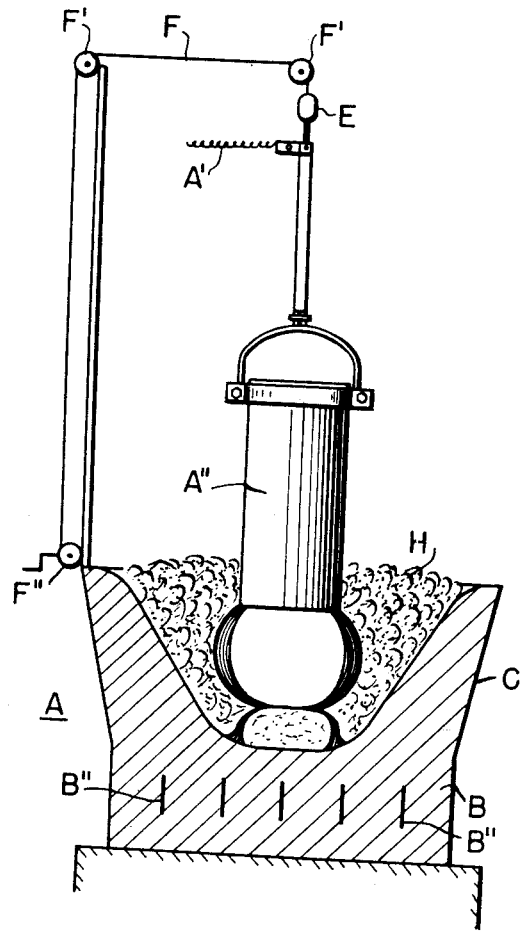

Other objects and advantages of the invention will hereinafter appear from the following description given with reference to the accompanying diagrammatic drawings, in which Figs. 1 and 2 illustrate conventionally, in two elevations at right angles, an apparatus suitable for carrying out the process, Fig. 3 being a sectional elevation.

For this purpose, a carbonaceous low-grade manganese ore, which may be raw or calcined beforehand, is simply crushed and treated in an electric furnace. There can also be used a mixture of calcined and uncalcined ores, in suitable proportions, in order to lessen the likelihood of volatilization of the metallic manganese. Reduction of the complex manganous carbonate is obtained by addition of a suitable quantity of carbon.

Referring to the drawings, the electric furnace, generally designated A, is arranged for heating for example by single-phase alternating current from a suitable source (not shown). The sole or bed B of the furnace forms one pole of supply, receiving current from a cable B' feeding a number of electrode-bars B'' embedded in the sole which latter is made of sufficiently refractory but electrically conductive material. The other pole of supply is connected to a cable A' which feeds an upper electrode A'' movable vertically in relation to the bed B and to the furnace casing C which contains the charge of primary materials to be heated by the resistance of the charge. At the front of the furnace, there is provided a support or runway for receptacles such as D into which the furnace products can be discharged.

The upper electrode A'' is suspended by means of an insulator E from a chain or cable F passing over suitable guide pulleys F' to an operating windlass F'', whereby the electrode A'' can be raised or lowered into the casing C. By lifting or lowering the electrode A'' the current density will be varied as desired.

As an alternative to the lifting and lowering of the electrode A'', there may be provided a plurality of such electrodes having different surface areas corresponding to the necessary current density, according to the capacity or power of the furnace; in this case, the suspension collar and supply connection will be made detachable so that they may be attached to any selected electrode, to obtain the desired current density if the available power is variable.

When constant power is available from a transformer, for example, the voltage applied to the furnace may be varied by changing the taps on the secondary side of the transformer in the well-known manner.

Two or more separate tapping or pouring mouths may be provided at different levels on the front of the furnace, the upper one G' being intended for the discharge of gangue or slag and the lower one G'' for the pouring of the manganese metal or alloy collecting upon the sole B of the furnace. The metal and slag may be discharged together through a common pouring mouth, separation then taking place outside the furnace.

The casing C is charged with primary materials indicated at H, these materials being crushed, mixed in desired proportions, and fed into the furnace by any convenient means, such as a screw conveyor (not shown).

The furnace is so arranged that the active surface of the upper electrode A″ penetrating into the material H can be regulated by raising or lowering the electrode by means of the windlass F″, according to the power available for the furnace, so that the current density on the upper electrode A″ shall be less than 4 amperes per square centimeter, for example between 0.8 and 3 amperes per square centimeter. On the sole B, the current density will be even lower; inasmuch as the current naturally concentrates beneath the working surface of the upper electrode, it may be stated that the current density on the sole will be between 0.6 and 1 ampere per square centimeter.

In my experimental work, in order to arrive at the desired result, I have operated at a low voltage of 30 to 35 volts, with a current density of 1 ampere per square centimeter and an electrode area of 700 square centimeters. These conditions are not strictly indispensable or limitative; it is possible, according to the size and capacity of the furnace, to vary the electrode surface area, the current density and/or the voltage.

With the electrical furnace in operation, loading of the materials is effected in a continuous manner, for example by means of the screw conveyor mentioned above. Metallic manganese is deposited upon the sole B of the furnace, as seen in Fig. 3, with a supernatant layer of gangue or slag, consisting of lime, magnesia and calcium carbide formed by reaction of lime and carbon.

By regulating the proportions and dosing of the carbon and low-grade manganese ore, it is possible to obtain a normal carbide as regards its yield of acetylene, in spite of the presence of magnesia exceeding 4%, whereas such a high proportion has never hitherto been admissible for obtaining a normal marketable carbide.

Manganese and calcium carbide are withdrawn from the electrical furnace conjointly, the carbide being removed simultaneously with the pouring of the metal, or separately by way of the mouths G′, G″ into suitable ladles or receptacles such as D, which are filled alternately with metal and with carbide.

A furnace such as represented in the drawings has been employed in the practice of the invention, as carried out by treatment of low-grade manganese ores from Les Cabesses, Ariege, France.

By way of example of the performance of the process forming the present invention, the electrical furnace is charged with a mixture of 36 parts by weight of small coal and 100 parts by weight of a complex carbonate, of which the average composition is as follows:

|  | Per cent |
|---|---|
| Calcium carbonate (CaCO$_3$) | 60 |
| Magnesium carbonate (MgCO$_3$) | 20 |
| Manganous carbonate (MnCO$_3$) | 20 |

In the course of my experiments, I have even used a poorer ore showing the following composition after calcination:

|  | Per cent |
|---|---|
| Magnesia (MgO) | 6.3 |
| Lime (CaO) | 30 |
| Silica (SiO$_2$) | 1.8 |
| Ferric oxide (Fe$_2$O$_3$) | 3 |
| Alumina (Al$_2$O$_3$) | 1.9 |
| Manganous oxide (MnO) | 12 |
| Loss by combustion | 44 |

From these operations, I have obtained a manganese alloy of the following composition:

|  | Per cent |
|---|---|
| Manganese | 77 |
| Silicon | 3.9 |
| Aluminum | 1.5 |
| Iron | 9 |
| Carbon | 6.2 |
| Phosphorus | 0.06 |
| Sulphur | 0.03 |

It is to be noted that the iron-content can be lowered by the use of coal or other reducing agents containing less ash, and by avoiding the use of iron rods for tapping and sheet iron for protection of the electrode. The manganese-content could in this way be raised to approximately 90% in the cast metal.

By combining the most favorable conditions of current density, voltage and suitable electrode areas, according to my process, a maximum yield will be obtained with the minimum loss of metal by volatilization.

Operating under the customary conditions in the preparation of electro-metallurgical products, there will be withdrawn from the furnace an upper layer of mixed calcium and magnesium carbides corresponding to 83% of the whole, and a lower layer in the form of a slightly carburized manganese ingot, corresponding to the remaining 17%.

Any other low-grade manganese ore of similar composition, more or less approximating to that given above, can be treated in the same manner for the preparation of manganese in marketable form.

What I claim is:

1. The method of simultaneously manufacturing metallic manganese and mixed calcium and magnesium carbides in a single resistance furnace which comprises the steps of charging the furnace with a mixture of approximately 36 parts by weight of coal and 100 parts by weight of a complex carbonate consisting of calcium carbonate, magnesium carbonate and manganous carbonate in the relative percentage proportions of about 60 percent, 20 percent and 20 percent, respectively, heating the mixture of said materials in said furnace and maintaining the density of the electric current through the mixed materials below about 4 amperes per square centimeter of electrode surface area, so as to deposit molten manganese on the sole of the furnace with a supernatant layer of slag including lime, magnesia and calcium carbides, and separately withdrawing the manganese and carbides.

2. The method of simultaneously manufacturing metallic manganese and mixed calcium and magnesium carbides in a single resistance furnace which comprises the steps of charging the furnace with a mixture of approximately 36 parts by weight of coal and 100 parts by weight of a complex carbonate consisting of calcium carbonate, magnesium carbonate and manganous carbonate in the relative percentage proportions of about 60 percent, 20 percent and 20 percent, respectively, heating the mixture of said materials in said furnace and maintaining the density of the electric current through the mixed materials below about 4 amperes per square centimeter of electrode surface area, and between about 0.6 and 1 ampere per square centimeter on the sole of the furnace, so as to depoist molten manganese on the sole of the furnace with a supernatant layer of slag including lime, magnesia and calcium carbides, and separately withdrawing the manganese and carbides.

PAUL FERDINAND FABARON.

References Cited in the file of this patent

UNITED STATES PATENTS

| Number | Name | Date |
|---|---|---|
| 790,389 | Price | May 23, 1905 |
| 790,390 | Price | May 23, 1905 |
| 805,783 | Dorian | Nov. 28, 1905 |
| 1,819,238 | Greene | Aug. 18, 1931 |
| 2,070,186 | Seil | Feb. 9, 1937 |
| 2,471,562 | Fittener | May 31, 1949 |

FOREIGN PATENTS

| Number | Country | Date |
|---|---|---|
| 126,303 | Great Britain | Dec. 11, 1919 |

OTHER REFERENCES

Chem. Abstracts, vol. 36, Nov. 21, 1942, page 6466, article by Kakabadze.